United States Patent [19]

Allen et al.

[11] Patent Number: 5,039,301

[45] Date of Patent: Aug. 13, 1991

[54] FLUIDIZED BED FURNACE

[76] Inventors: John V. Allen, 1554 Matthews, Vancouver, British Columbia V6J 2S9; Berend Put, 4660 Pheasant Place, North Vancouver, British Columbia V7R 4G3; Geoff W. Boraston, 1104 - 1265 Burnaby Street, Vancouver, British Columbia, all of Canada

[21] Appl. No.: 532,246

[22] Filed: Jun. 5, 1990

Related U.S. Application Data

[63] Continuation of Ser. No. 286,133, Dec. 19, 1988, abandoned.

[30] Foreign Application Priority Data

Dec. 17, 1987 [CA] Canada .................................. 554734

[51] Int. Cl.⁵ .......................... F27B 15/00; F23G 5/00
[52] U.S. Cl. ...................................... 432/58; 110/245; 432/15
[58] Field of Search ...................... 432/15.58; 110/245

[56] References Cited

U.S. PATENT DOCUMENTS

| | | | |
|---|---|---|---|
| 4,035,152 | 7/1977 | Yang et al. | 432/15 |
| 4,249,472 | 2/1981 | Mitchell | 110/245 |
| 4,391,102 | 8/1983 | Gamble et al. | 432/58 |
| 4,404,755 | 9/1983 | Stewart et al. | 432/58 |
| 4,425,303 | 1/1984 | Schilling et al. | 432/58 |
| 4,447,297 | 5/1984 | Shang et al. | 432/58 |
| 4,823,740 | 4/1989 | Ohshita et al. | 110/245 |
| 4,879,958 | 11/1989 | Allen et al. | 110/245 |

Primary Examiner—Henry C. Yuen
Attorney, Agent, or Firm—Shlesinger, Arkwright & Garvey

[57] ABSTRACT

In a fluidized bed thermal reactor. It includes a main housing including a waste inlet, an exhaust gas outlet, an incombustible solids outlets, a base member, a fluidizable medium located on the base member, a plurality of gas inlets in the base member.

5 Claims, 1 Drawing Sheet

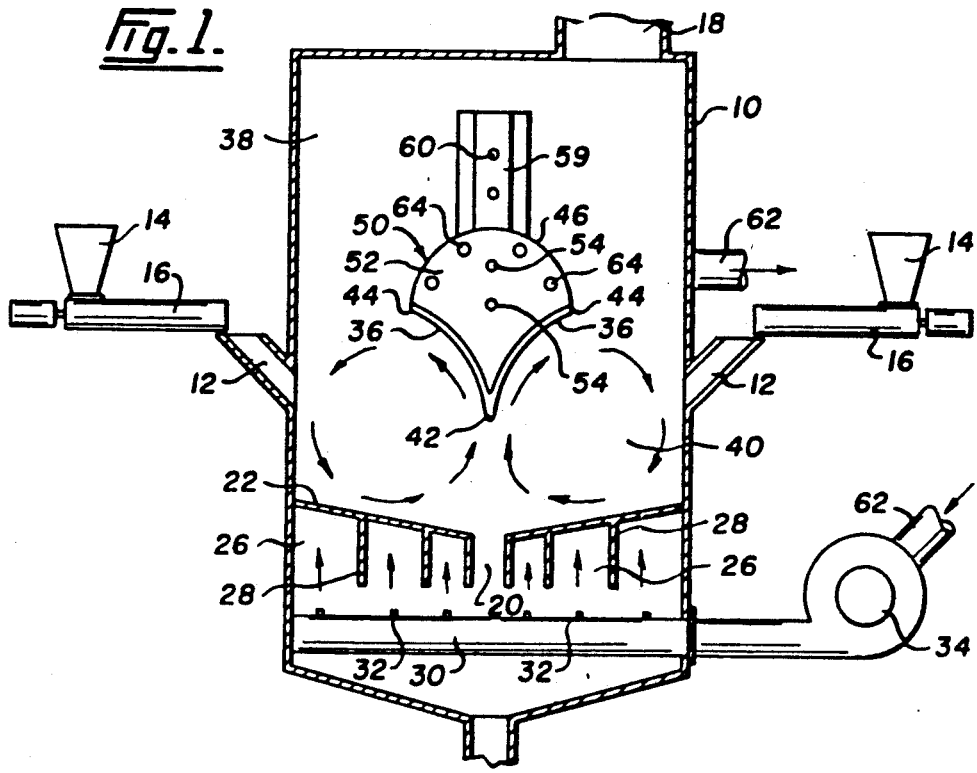
Fig. 1.
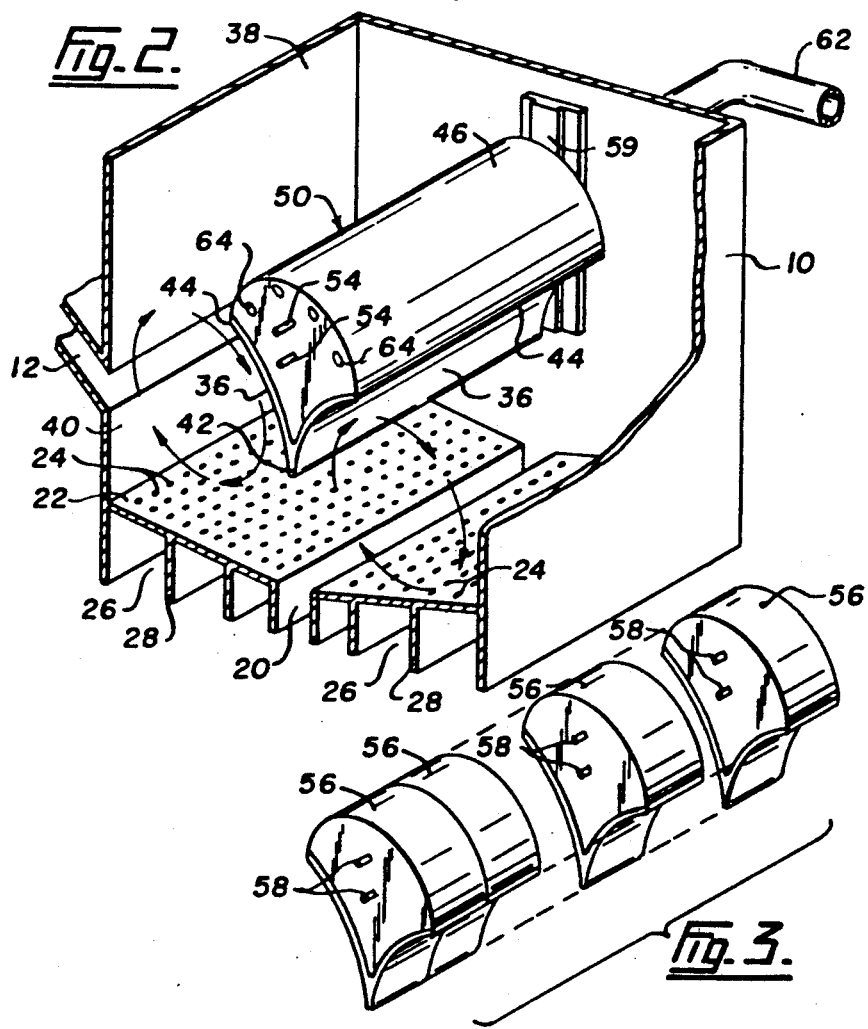
Fig. 2.
Fig. 3.

FLUIDIZED BED FURNACE

This application is a continuation of application Ser. No. 286,133, filed Dec. 19, 1988, abandoned.

FIELD OF THE INVENTION

This invention relates to a fluidized bed, thermal reactor.

DESCRIPTION OF THE PRIOR ART

The combustion of waste is of some considerable antiquity. Originally open hearth type furnaces, similar to those used in large boilers, were used for waste incineration. However, these proved inefficient in the combustion of solids. Raked hearths and moving grate devices were developed to provide better combustion and, in particular, high temperatures. However, these moving grate devices developed into very large and cumbersome incinerators that require a high degree of maintenance of the hearth moving grates and require large amounts of combustion air and long residence time to produce only relatively low combustion efficiencies.

A major development was the use of fluidized beds to provide better contact between the waste and combustion gases and to avoid having mechanical moving parts within the incinerator. The material of the bed acts as a high temperature heat exchange medium. However, simple fluidized beds suffer from an inability to ensure a uniform furnace temperature, to move non-combustibles out of the bed and to evenly distribute the fuel throughout the bed.

A fluidized bed is created by blowing a gas, frequently air, through a solid so that the solid moves or flows with the air in the manner of a fluid. Typically in incineration an inert solid, for example sand, is used as a fluidized bed heat exchange medium.

With the given disadvantages of the use of simple fluidized beds in incineration combustion the next step was the development of revolving fluidized beds in which combustion efficiency was greatly improved by providing vigorous cross and vertical mixing of the waste and combustion gases. An early patent in this field is British Patent No. 1,299,125 granted to Power Gas. In that patent a non-uniform fluidized bed is used. By introducing a mixture of combustible and non-combustible refuse onto the surface of the bed, good combustion is achieved.

A further development was in British Patent No. 1,577,717 where a thermal reactor was divided into an inner and an outer concentric compartments with a conical baffle positioned above the inner compartment.

However, there were disadvantages in this process and such disadvantages are outlined in U. S. Pat. No. 4,419,330 issued Dec. 6, 1983 to Ishihara et al. as including:

Large sized objects may clog the gap between the lower end of the inner compartment and the base of the furnace. Because of the use of two compartments the descending rate of the moving bed portion is small and the amount of circulating fluidized medium is limited, which in turn limits the capacity for incineration. The range in which the descending rate of the moving bed can be controlled is small and the gas generated during the descent is prevented from being delivered to the combustion zone, that is the fluidized bed, so that the gases merely burn within the apparatus, without being used to heat the medium. Furthermore, the use of concentric compartments means that repair and maintenance of the device, particularly of the inner compartment, can be difficult.

Ishihara et al. claimed to have solved these problems in providing a fluidized bed thermal reactor that featured deflecting means on each opposed inner side wall of the reactor. The deflecting means extend inwardly towards each other to provide a waisting effect in the reactor. By this means gas flow within the reactor was improved.

Although the equipment as exemplified by Ishihara et al. has provided extremely good results there are a number of disadvantages. In particular, the arrangement of deflectors on the interior of exterior walls means that the gas must flow up the outside walls, be deflected inwardly by the projections and then downwardly in the middle. In this regard it should be emphasized that there are twin fluidized beds, operating in parallel. This flow pattern is contrary to the natural flow in a fluidized bed which is upwardly at the centre, outwardly and then downwardly at the outer surface of the furnace. Furthermore, the inwardly projecting walls in the Ishihara et al. proposal means relative complexity of structure and consequent expense.

Also, the equipment of Ishihara et al does not provide an ideal fuel feed location. With large thermal reactors, the fuel must be dropped from above onto the sinking portion of the bed. This can result in some suspension burning.

SUMMARY OF THE INVENTION

It is accordingly the intention of the present invention to greatly simplify the production of thermal reactors by providing a structure that permits simplicity of housing shape and relies on a simply constructed, easily replaceable internal baffle system to provide the advantages of twin fluidized beds within a single furnace. This invention allows the fuel to be introduced into the sinking portion of the bed along the full length of the reactor without dropping the waste from above.

Accordingly, the present invention provides a fluidized bed thermal reactor comprising:
a main housing including:
a waste inlet;
an exhaust gas outlet;
an incombustible solids outlet; a base member;
a fluidizable medium located on the base member;
a plurality of gas inlets in the base member whereby a fluidizing medium located on the base member may be fluidized;
the improvement comprising a pair of deflector surfaces positioned to divide the main housing into an upper and lower compartment and to deflect rising gases in the lower compartment outwardly to form a pair of fluidized beds.

DESCRIPTION OF THE DRAWINGS

Aspects of the invention are illustrated, merely by way of example, in the accompanying drawings in which:

FIG. 1 is a side elevation of a reactor according to the present invention;

FIG. 2 is a schematic view illustrating the mode of operation of the furnace of FIG. 1; an FIG. 3 illustrates a detail of the reactor of the invention.

DESCRIPTION OF THE PREFERRED EMBODIMENTS

FIG. 1 shows a fluidized bed thermal reactor comprising a main housing 10 including a pair of waste inlets 12 and means to provide waste to those inlets in the form of hoppers 14 and conveyers 16. There is an exhaust gas outlet 18 at the top and an outlet 20, in the bottom, so that uncombusted solids may be removed from the reactor. The reactor has a base member 22 and a fluidized medium, not shown for convenience but comprising sand or the like chemically inert, refractory material, is located on the base 22. A plurality of gas inlets or openings 24 are formed in the base member. There are compartments 26 formed by walls 28 beneath the base 22 to permit variation in the flow of gas, usually air, to differing areas of the base 22. This arrangement, which is known from the prior art, provides some control of the direction and vigour of fluidization of the bed. There is an air inlet pipe 30, with jets 32, and a pump 34 so that air may be pumped into the reactor.

According to the present invention a pair of deflector surfaces 36 are positioned to divide the main housing 10 into an upper compartment 38 and lower compartment 40. As shown particularly in FIG. 1 the pair of surfaces 36 deflect the rising gas in the lower compartment outwardly to form a pair of fluidized beds. The direction of flow is particularly important. By selecting the gas flow through the base 22 and positioning the deflector surfaces 36 as shown, the desired flow direction of refractory material and fuel can be achieved, that is upwardly at the centre, outwardly and downwardly at the outer edge. The deflector surfaces are arcuate and, in a preferred embodiment, they are joined at a lower most point 42 then curved upwardly to their outer edges 44. An upper surface 46 joins the outer edges of the deflector surface 36 both to stabilize the deflector and to provide a closed body 50 having an interior void 52. The combination of deflector surfaces 36 and the upper surface 46 form a generally triangular body extending across the main housing 10 as shown particularly in FIG. 2. The triangular body 50 may be raised or lowered, depending upon combustion conditions that are required. FIGS. 2 and 3 illustrate the means of suspending the triangular body by the use of projections 54 extending pipes, engaging recesses (not shown) in the wall of the main housing 10. As shown in FIG. 3 the structure of the body is simplified if the body comprises a plurality of abutting modules 56, each joined by projections 58, engaging in openings, not shown, in the neighboring module 56.

Body 50 may be moved upwardly and downwardly by the provision of tracks 59 formed with openings 60 to receive projections 54. Unused openings 60 may be sealed.

The deflector surfaces 36 are desirably of a heat resistant ceramic.

In the illustrated, preferred embodiment, there is an air inlet (not shown) to the interior of the body 50 so that air may be introduced into the body 50, heated in the body 50 and then passed through pipe 62 to the pump 34 so that the fluidizing gas is preheated. This greatly increases the thermal efficiency of the unit. By the same means heat transfer can be achieved by, for example, running water pipes 64 through the body 50 as a means of extracting heat for use in, for example, central heating and the like systems.

In conventional manner the exhaust gases can also be used as a source of heat. Although it is common, sound practice to use heat in this manner the present apparatus is particularly suitable, by the location of the hollow body 50 within the reactor, for providing excellent heating capabilities.

The apparatus according to the present invention is used in a conventional manner, that is the fuel that is used is waste material, fed through inlets 12. The heating process is started by using oil, gas or the like fuel to combust in the furnace. Fluidizing gas, usually air, is forced through the openings 24 to fluidize the bed. The refuse is then brought into contact with the fluidized bed and thereafter the process is self-sustaining, that is the oil or gas is not supplied; the refuse maintains its own combustion.

Ash is removed through outlet 20 and exhaust gases leave the furnace through 18. The furnace can, as in the prior art, be used to generate electricity, can be used as a source of heat and is, in addition to these, an extremely efficient means of rendering municipal and industrial waste and the like into an innocuous solid of minute volume compared with the material fed to the reactor.

We claim:

1. In a fluidized bed thermal reactor comprising:
   a main housing including:
   a waste inlet;
   exhaust gas outlet;
   an incombustible solids outlet; a base member;
   a fluidizable medium located on the base member;
   a plurality of gas inlets in the base member whereby a fluidizable medium located on the base member may be fluidized;
   a pair of deflector surfaces positioned to divide the main housing into an upper and lower compartment and to deflect rising gases in the lower compartment outwardly to form a pair of fluidized beds;
   the deflector surfaces are arcuate surfaces and are joined at a lowermost point then curved upwardly to their outermost edges;
   an upper surface joining the outermost edges of the deflector surfaces, the combination of deflector surfaces and upper surface form a generally triangular body is composed of a plurality of the generally triangular body is composed of a plurality of abutting modules composed of a castable refractory material.

2. A reactor as claimed in claim 1 in which the generally triangular body is supported at opposed sides of the housing.

3. A reactor as claimed in claim 1 in which the deflector surfaces are of heat-resistant ceramic.

4. A method of operation of a fluidized bed thermal reactor, comprising the steps of:
   a) providing a main housing having a waste inlet, an exhaust gas outlet, an incombustible solids outlet, a base member, a fluidizable medium located on the base member, a plurality of gas outlets in the base member whereby the fluidizable medium on the base member may be fluidized, and control means for controlling the velocity of gas entering the main housing;
   b) providing at least first and second deflector surfaces positioned to divide a main housing into upper and lower compartments and to direct rising gases outwardly to form at least first and second fluidized beds;

c) forming the lower compartment as an open space free of any structure directing as flow;

d) controlling gas entering the main housing to progressively vary the velocity of the gas over the first and second fluidized beds; and, e) forming the first fluidized bed substantially separate and distinct from the second fluidized bed by controlling the velocity of the gas in the first and second fluidized beds and deflecting rising gas outwardly from the first and second deflector surfaces.

5. A method of operation of a fluidized bed thermal reactor, comprising the steps of:

a) providing a main housing having a waste inlet, an exhaust gas outlet, an incombustible solids outlet, a base member, a fluidized medium located on the base member, a plurality of gas outlets in the base member whereby the fluidizable medium on the base member maybe fluidized, and control means for controlling the velocity of gas entering the main housing;

b) providing at least first and second deflector surfaces positioned to divide a main housing into upper and lower compartments and to direct rising gases outwardly to form at least first and second fluidized beds;

c) forming the lower compartment as an open space free of any structure directing as flow;

d) controlling gas entering the main housing to progressively vary the velocity of the gas over the first and second fluidized beds; and e) forming a substantially closed path of circulation in the first bed by controlling the velocity of the gas in the first fluidized bed and deflecting rising gas outwardly from the first deflector surface; and, f) forming a substantially closed path of circulation in the second fluidized bed by controlling the velocity of the gas in the second fluidized bed and deflecting rising gas outwardly from the second deflector surface.

* * * * *